Figure 1:
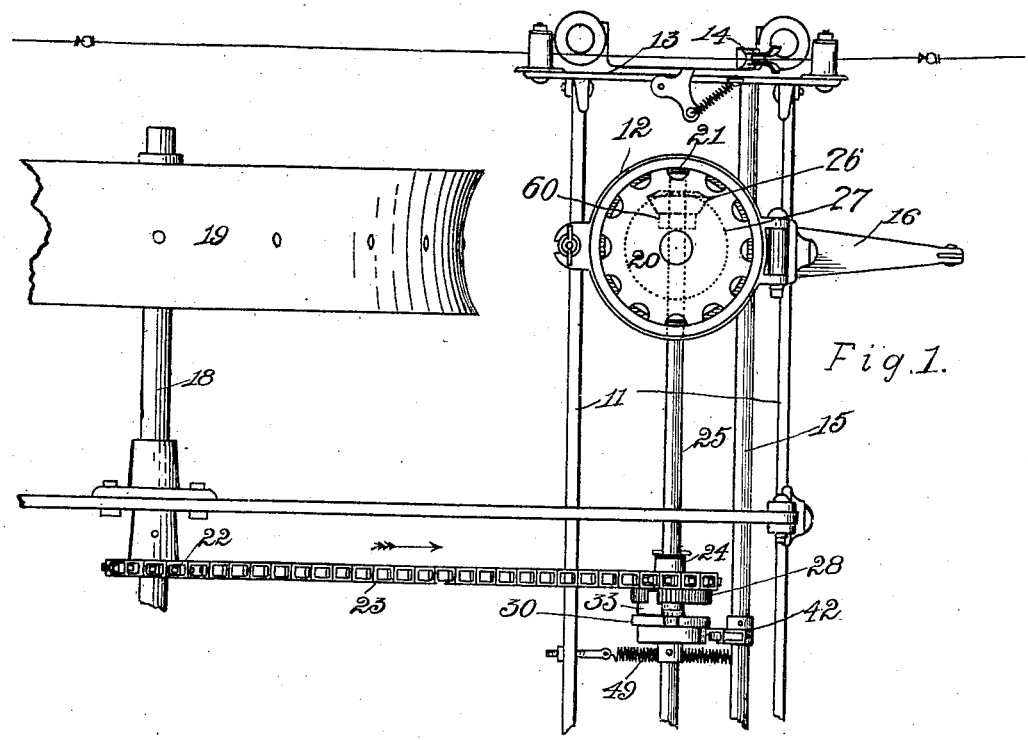

No. 879,461. PATENTED FEB. 18, 1908.
W. S. GRAHAM.
CORN PLANTER.
APPLICATION FILED SEPT. 6, 1907.

3 SHEETS—SHEET 1.

Witnesses.
Inventor.
William S. Graham
by
Bens Adams, Pickard & Jackson
Attys

No. 879,461. PATENTED FEB. 18, 1908.
W. S. GRAHAM.
CORN PLANTER.
APPLICATION FILED SEPT. 6, 1907.

3 SHEETS—SHEET 2.

Witnesses.
C. J. Eggleston.
N. E. McCamey

Inventor.
William S. Graham
by
Bair Adams, Pickard Jackson
Attys.

No. 879,461. PATENTED FEB. 18, 1908.
W. S. GRAHAM.
CORN PLANTER.
APPLICATION FILED SEPT. 6, 1907.
3 SHEETS—SHEET 3.
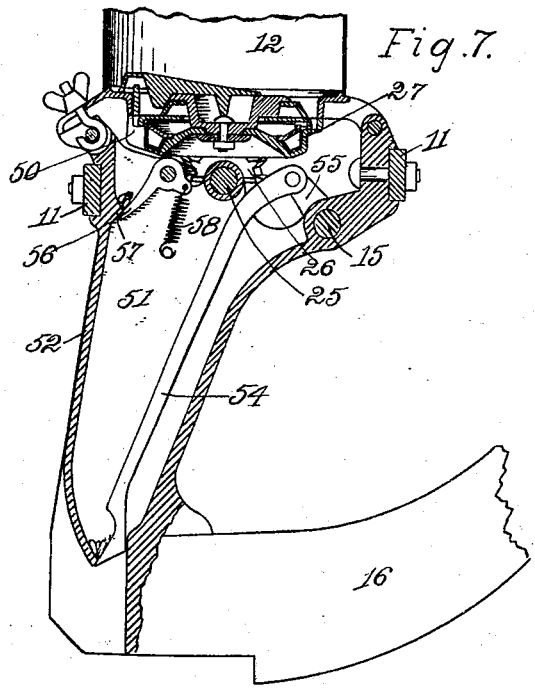
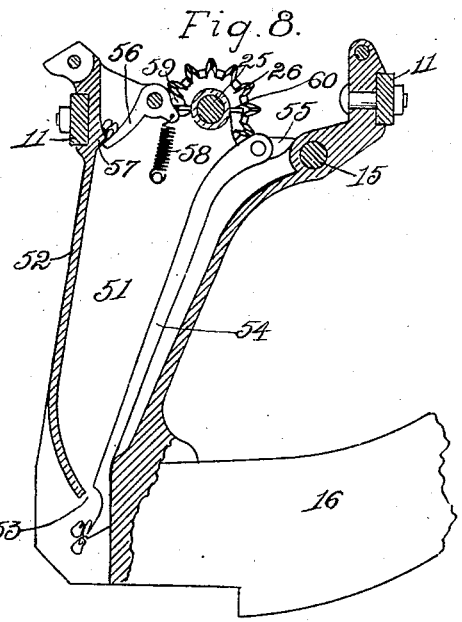
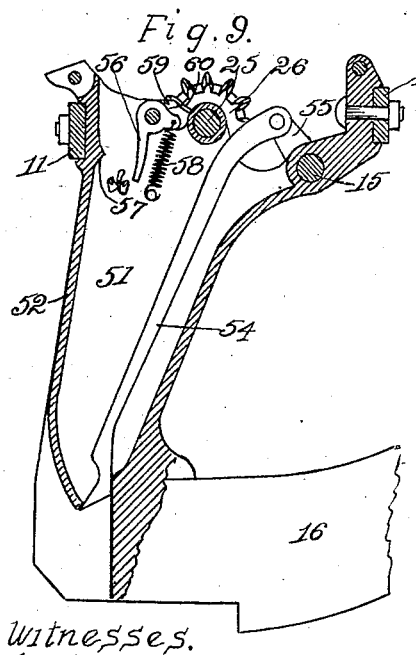
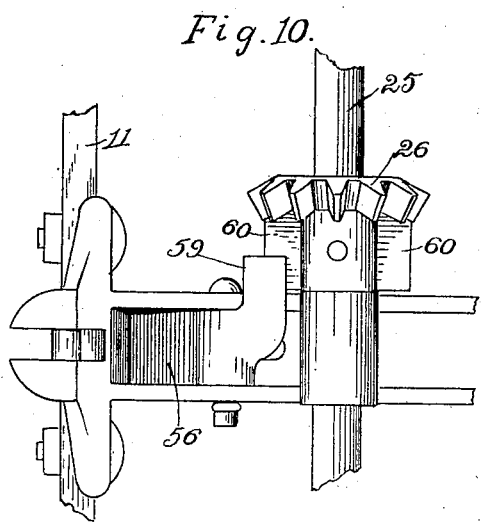
Witnesses.
Inventor.
William S. Graham

UNITED STATES PATENT OFFICE.

WILLIAM S. GRAHAM, OF CANTON, ILLINOIS, ASSIGNOR TO PARLIN AND ORENDORFF COMPANY, OF CANTON, ILLINOIS, A CORPORATION OF ILLINOIS.

CORN-PLANTER.

No. 879,461.   Specification of Letters Patent.   Patented Feb. 18, 1908.

Application filed September 6, 1907. Serial No. 391,579.

*To all whom it may concern:*

Be it known that I, WILLIAM S. GRAHAM, a citizen of the United States, residing at Canton, in the county of Fulton and State of Illinois, have invented certain new and useful Improvements in Corn-Planters, of which the following is a specification, reference being had to the accompanying drawings.

My invention relates to corn planters, and its principal object is to provide a new and improved driving mechanism for the seed-plate to insure the delivery of a given number of grains of corn with each operation of the check-rower.

As is well known, various plans and mechanisms for driving the seed-plate have been designed, looking to that end. One well-known method is to drive the seed-plate by connections with the check-rower mechanism whereby with each throw of the check-rower mechanism the seed-plate is given a definite predetermined rotation causing a given number of seed-cells to pass over the discharge orfice in the seed hopper,—the runner valves being also operated by the check-rower mechanism in order to deposit in the ground at suitable intervals the charge of corn. One serious objection to this method of driving the seed-plates lies in the fact that it puts too great a strain on the check-rower wire. Another method is to drive the seed-plate continuously by connections with the axle of the covering wheels of the planter, leaving the check-rower to operate only the runner valve. While this plan relieves the strain on the check-rower wire, it is open to the objection that by reason of slippages and irregularities in the ground the seed-plate will be irregularly driven so that it carries either too few or too many seed-cups over the discharge opening. Another method has been devised which, broadly speaking, consists in supplying clutch mechanism between the seed-plate and a sprocket-wheel, driven continuously from the bearing wheels, of such a character that when the clutch is in operation it will drive the seed-plate through a predetermined distance at a speed in excess of that which would be required of it were continuously operating,—the clutch mechanism being controlled by the check-rower apparatus, so that with each throw of the check-rower apparatus the clutch is engaged, rotated the predetermined distance and then disengaged until the next throw of the check-rower wire, the check-rower mechanism also operating the seed valves. Another plan has been to drive the seed-plate from the rear wheels at a speed slower than what would be required to cause a given number of seed-cells to pass over the discharge opening, and to provide mechanism operated by the check-rower mechanism for accelerating the movement of the seed-plate to a proper amount with each throw of the check-rower mechanism.

In my improved mechanism for driving the seed-plate I cause the seed-plate to be driven at a speed which, under normal conditions, will be practically continuous and substantially the same as that required to cause a given number of cells to pass over the discharge opening, and to supplement this mechanism with mechanism operated by each throw of the check-rower mechanism to accelerate the speed of the plate a proper amount if through slippage or other causes it is running too slow, and to check the rotation of the seed-plate in case it is running at a speed too fast to cause the given number of cells to pass over the discharge opening. Generally speaking, and to that end, I employ a single-cell seed-plate which is rotated by means of a shaft mounted on the front frame and driven by a sprocket-chain from the rear wheels through the medium of a clutch on said shaft. The clutch mechanism is so constructed as to be normally and practically in continuous engagement to drive the seed-plate continuously at a speed which is sufficient to cause the desired number of cells to pass over the discharge orifice. The clutch is provided with mechanism operated by mechanism on the check-rower shaft to speed the rotation of the speed-plate in case it runs too slowly at any time, and to stop the rotation in case it is running too fast. As long as it is running in normal speed, the throw of the check-rower mechanism does not cause the mechanism to interfere with the normal operation of the seed-plate. It is a further object of my invention to provide in such a machine a new and improved form of upper runner valve operated by the shaft which drives the seed-plate. As is well known, in this class of machines the runners are provided with an upper and a lower valve, the former located just below the discharge spout of the hopper and the lower at the heel of the runner. The function of the upper valve is to receive the seed dropped from the hopper by the seed-plate, and when a full charge is accumulated to discharge the same upon the lower valve, the lower valve then discharging the charge into the ground. Both of these valves have been operated by the check-rower mechanism, and one difficulty arises from the fact that either by the reason of the slight delay of the last kernel of the charge or for other reasons well known the upper valve will be opened either a little before the full charge is accumulated or before the lower valve is closed, causing the corn to "dribble" and preventing accuracy of hilling. In my new and improved planter the lower valve only is driven by the check-rower mechanism, and the upper valve is driven by the shaft which controls the rotation of the seed-plate. I attain these objects as illustrated in the drawings and hereinafter described.

That which I believe to be new is set forth in the claims.

Figure 2:
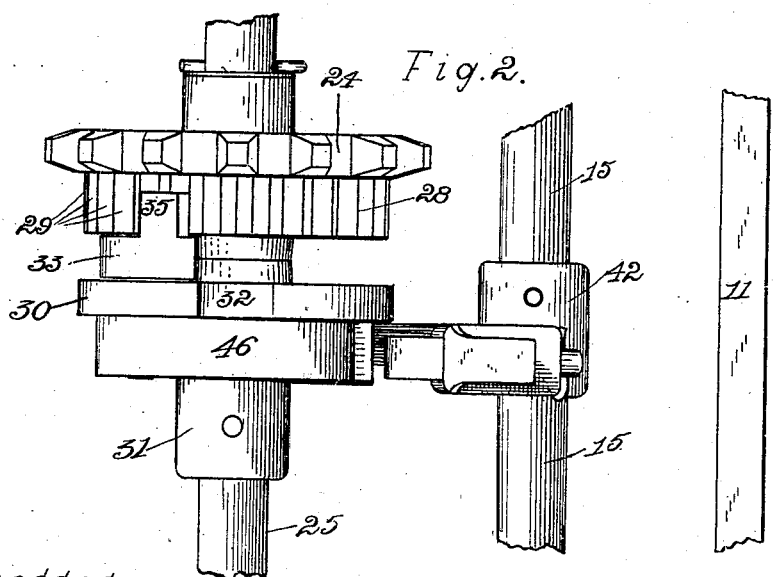
Figure 3:
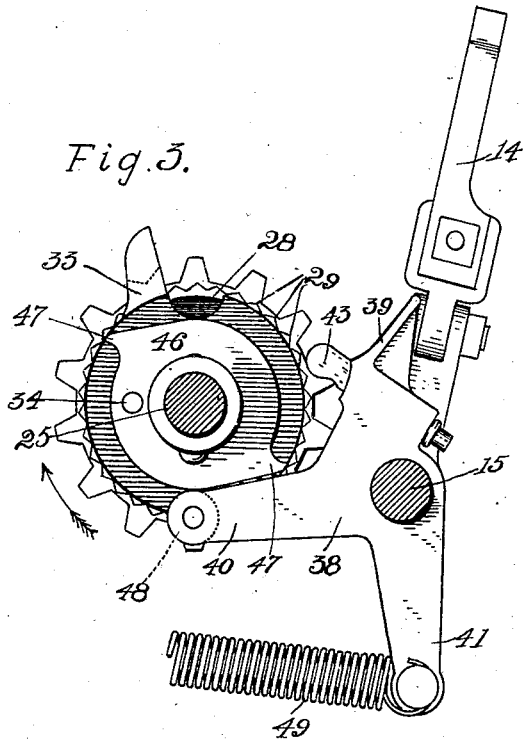
Figure 5:
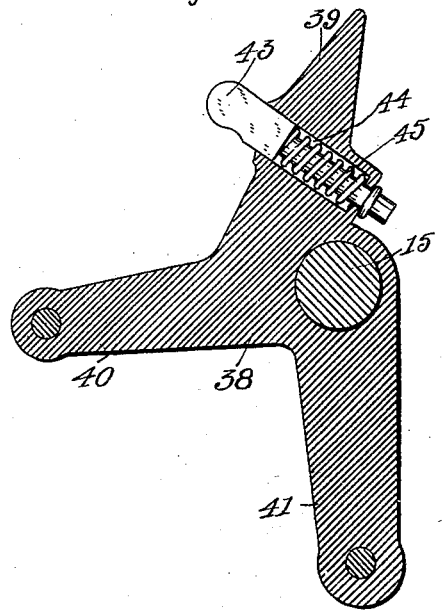
Figure 4:
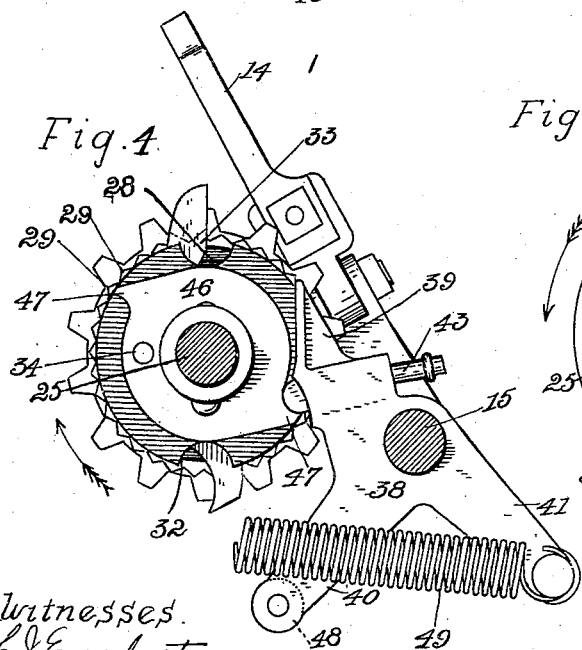
Figure 6:
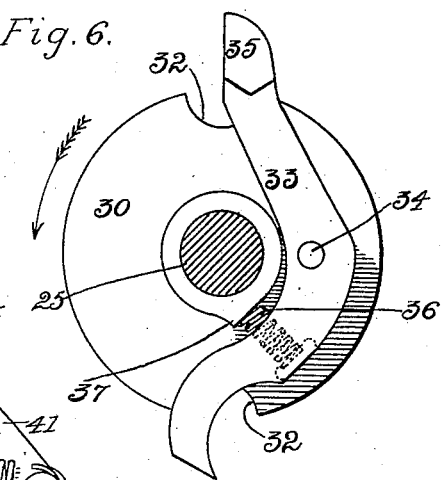

In the drawings,—Figure 1 is a top or plan view of a portion of one side of a planter; Fig. 2 is an enlarged detail, being a top or plan view of portions of the seed-plate driving-shaft and the clutch mechanism, the check-rower rock-shaft, and the speeding or slowing mechanism; Fig. 3 is a side elevation of the clutch and accelerating and slowing mechanism, showing the fork lever in its forward position before being thrown by the check-rower wire; Fig. 4 is an enlarged detail, being a view of the same parts with the fork lever in its rearward position; Fig. 5 is an enlarged detail, being a vertical section through the three-armed lever which speeds or delays the movement of the seed-plate; Fig. 6 is an enlarged detail, being a view of the pawl which engages the clutch member and a portion of the clutch member upon which it is mounted, viewed from the other side from the views shown in Figs. 3 and 4; Fig. 7 is an enlarged detail, being a vertical section through the hopper and runner shank; Fig. 8 is an enlarged detail, showing the same parts with the lower valve in the discharging position; Fig. 9 is an enlarged detail, being a view of the same parts with the upper valve in discharging position; Fig. 10 is an enlarged detail, being a top or plan view of a portion of the runner and the driving shaft to show the upper valve and its operating mechanism.

Referring to the drawings,—11 indicates the front frame of a planter on which are mounted seed-boxes 12 and a check-rower head 13.

14 indicates a check-rower lever which is mounted upon a rock-shaft 15, which is journaled in the front frame.

16 indicates the runners or furrow openers upon which the front frame is mounted.

18 indicates the rear axle on which are mounted the usual covering wheels 19 and which is connected in the usual manner with the front frame 11.

20 indicates a seed-plate, which is provided with seed-cells 21 each adapted to carry a single grain of corn, and which is mounted in the bottom of the hopper 12.

22 indicates a sprocket-wheel, which is secured to the axle 18 and carries a sprocket-chain 23.

24 indicates a sprocket-wheel, which is loosely mounted upon a shaft 25 journaled in the front frame below the seed-boxes. The sprocket-wheel 24 is continuously driven by means of the sprocket-chain 23 and the sprocket 22 upon the wheel axle 18.

26 (see dotted lines in Fig. 1 and Figs. 7 to 10) indicates a beveled gear, which is mounted upon the shaft 25 below the hopper 12 and meshes with a beveled gear 27 carried by the hopper and adapted to engage the seed-plate 20 in any well-known and approved manner. The gears 26 and 27 stand in the relation of one to two, so that with each rotation of the shaft 25 the seed-plate will be given one-half a rotation.

28 indicates a disk, which is secured to and preferably formed integral with the sprocket-wheel 24 upon one side thereof, and which is provided upon its periphery with a series of ratchet-teeth 29. This disk with its ratchet-teeth forms one clutch member.

30 indicates a disk, which is provided with a hub 31 and is secured upon the shaft 25 a short distance away from the outer surface of the disk 28. The disk 30 is provided with two depressions 32 in its periphery placed diametrically opposite each other and a semi-circumference apart. These depressions are, as best shown in Figs. 3 and 4, approximately semicircular to receive the roller hereinafter described.

33 indicates a pawl, which is pivoted upon the inner surface of the disk 30 to one side of the axial line thereof by means of a pivot-pin 34. The upper end of the pawl is provided with a projection 35, the under edge of which —shown in dotted lines in Figs. 3, and 4—is adapted to engage with the ratchet-teeth 29 on the disk 28 and is held normally in engagement therewith by means of a spring 36 seated in a suitable socket in the lower portion of said pawl 33 and bearing against a lug 37 projecting from the inner face of the disk 30.

It will be obvious from the above description that as long as the projection 35 of the pawl 33 is in engagement with the ratchet-teeth 29 the disk or clutch member 30 will be carried around in the direction indicated by the arrows and the shaft 25 driven with it, causing the rotation of the seed-plate. The diameter of the wheels 19, the relative size of the sprocket-wheels 23—24, and the gearing by which the seed-plate 20 is driven are so arranged that when the machine is running normally the seed-plate will be practically continuously driven, interrupted only in actual operation for a mere instant, as hereinafter described, and at such a speed as to cause a predetermined number of seed-cells to pass over the discharge orifice of the hopper between each throw of the check-rower mechanism— that is to say, will rotate a predetermined distance between the cross rows on which the corn is planted.

38 indicates a three-armed lever having arms 39, 40 and 41, which is pinned, or otherwise secured, by means of a hub 42 to the rock-shaft 15. The upper arm 39 carries a pin 43, best shown in Fig. 5, which is slidingly mounted in a suitable opening 44 therein and is normally held in the outward position shown in Fig. 5 by means of an expansion spring 45. The outer end of the pin 43 is rounded in order to engage the bar hereinafter described.

46 indicates a disk formed upon and preferably integral with the disk 30 upon the outer surface thereof. The disk 46 is provided with two diametrically opposite lugs 47 which are adapted to be engaged by the pin 43 when the check-rower lever is thrown, as hereinafter described, if the seed-plate is run too slowly. The arm 40 carries upon its outer end a roller 48, shown in dotted lines in Figs. 3 and 4. The lever 38 is so located upon the shaft as to be in register with the disk 46 and with the roller 48 in register with the disk 30. A spring 49 connects the lower arm 41 of the three-armed lever 38 with the rear part of the front frame 11, as is best shown in Fig. 1, and operates to normally hold the rock-shaft 15 in the position shown in Fig. 3—that is to say, with the fork lever 14 in its forward position and yielding against the pressure of the tappet wire to instantly restore the rock-shaft 15 and fork lever to the original position when the fork lever is released from the tappet-wire knot.

The operation of the parts above described is as follows: We will suppose the parts to be in the position shown in Fig. 3. In this position the roller 48 is shown as lying in one of the notches 32, forcing the lower end of the pawl 33 back against the action of the spring and thus throwing the lug 35 out of engagement with the ratchet-teeth 29. The parts are released from engagement by moving the fork lever temporarily back to release the roller 48, throwing the pawl into engagement with the ratchet-teeth and the clutch member 30 and the machine started. The clutch members therefore being in engagement, the seed-plate is at once set in rotation and is rotated at a speed adapted to carry the predetermined number of seed-cells over the discharge opening 50 of the hopper by the time that the check-rower is ready to operate and between each successive throw of the check-rower mechanism, and this is the normal and practically constant speed of rotation as long as no slippage or other cause causes the plate to be driven too fast or too slow. Rotating at this speed, the clutch parts will have assumed the position shown in Figs. 3 and 4 at the moment that the tappets on the check-rower wire operate the fork lever 14,—the roller 48 riding around upon the periphery of the disk 30. Just as this roller would be in position to enter the recesses 32 and throw the clutch out of engagement, the fork lever is operated, the parts thrown into the position shown in Fig. 4, and the roller is thus thrown away from engagement with the periphery of the disk 30, permitting the clutch member to remain in engagement. At most, in practice, if the roller 48 entered the recesses and threw out the clutch the withdrawal would be so instantaneous as to cause its instant release again and not interfere, at any rate for more than an instant of time, with the continuous rotation of the seed-plate. If, however, the seed-plate at any portion of the travel is running too fast, the notches 32 will arrive at the position in which they would engage with the roller 48 a corresponding amount of time prior to the throw of the fork lever. The rollers 48 would, therefore, enter the notches, throwing back the pawl 33 out of engagement with the ratchet-teeth 29 and holding it out of engagement until the throw of the fork lever disengaged the roller 48 from one of the notches 32, causing the pawl to be returned to its normal position in engagement with the ratchet-teeth 29 and the rotation to begin again. It will be seen that by this means the seed-plate is prevented from traveling more than a predetermined amount of rotation to discharge the given number of seed-cells in case the proper speed is exceeded. In case the seed-plate, however, is running too slow, the additional rotation is given to it by the operation of the spring-seated pin 43.

It will be obvious that while the check-rower lever is in its normal position—that is, that shown in Fig. 3—the pin is out of contact with either of the lugs 47 on the disk 46 and that if the speed is normal the clutch members at the time of the throw of the check-rower mechanism will be in the position shown in Figs. 3 and 4, and the pin when the check-rower is thrown will merely come into the position shown in Fig. 4 without forcible contact with the lugs 47, sliding backward in its recess against the action of the spring 45 slightly, as is shown in Fig. 4. In case, however, the speed of rotation is too slow, the disk 46 will not have reached the position shown in Figs. 3 and 4 at the time of the throw of the check-rower mechanism, and when the fork lever is thrown and the rock-shaft 15 rocked the arm 39 of the three-armed lever 38 will be thrown in the same direction, causing the end of the pin 43 to come in contact with one of the lugs 47, causing the additional rotation of the disks 46 and 30 and consequently the shaft 25, the pawl 33 slipping a corresponding amount over the teeth 29 by reason of its spring-seated arrangement, as will be readily understood.

It will be understood from this description, that a perfect regulation of the speed of the seed-plate may be obtained; that when the planter is running normally and without slippage, it will be driven continuously and the requisite number of grains of corn discharged through the discharge opening ready to be discharged from the planter with each throw of the check-rower mechanism; that if the speed, for any cause, is accelerated, it will be checked and more than the predetermined amount of rotation prevented; and that if running too slow, it will be speeded and the predetermined amount of rotation given by the operation of the check-rower mechanism.

In the form in which my invention is embodied, as shown in the drawings, the gear 26 of the shaft 25 is given one-half as many teeth as those upon the gear 27, whereby the seed-plate, of course, will be given one-half a rotation for each rotation of the shaft 25 or one-quarter of a rotation for each rotation of the shaft 25 and the clutch plate 30. With each semi-rotation, therefore, of the clutch disk 30 the seed-plate will be given one-quarter of a rotation, causing three seed-cells to pass over the discharge opening. As there are two notches 32 on the disk 30 which the roller 48 is designed to enter, and as the roller 48 entering either one of the notches contacts one or the other arm of the pawl 33, in case the mechanism is running too slow the clutch will be disengaged and the rotation of the seed-plate stopped, as has been explained above, temporarily long enough to correct the irregularity of the drive and prevent more than three holes passing over the discharge orifice. For the same reason, as the pin 43 is adapted to coact with either one of the lugs 47, which are two in number and diametrically opposite each other on the disk 46, the running at too slow a speed will be correspondingly corrected and the seed-plate given its desired rotation. By means of this mechanism a given number of grains of corn will be discharged through the discharge opening between each throw or operation of the check-rower devices to the secondary or runner valves ready to be discharged into the ground.

My improved upper runner valve is best shown in Figs 7 to 10, inclusive. Referring to these figures, 51 indicates the runner shank, which is provided with a rear wall 52 which extends downward and thence forward to form a discharge opening 53 at the bottom near the heel of the runner. 54 indicates a lower valve, which is in the form of a plunger valve whose lower end, when it is raised, is adapted to fill the opening 53 and hold the corn delivered to it by the upper valve, as is best shown in Fig. 7. The valve is raised and lowered by means of an arm 55 secured to the rock-shaft 15 and operated by the check-rower mechanism. As any well-known form of lower valve may, however, be used, and as the valve shown is of a well-known form and construction and forms no part of my invention, it is believed it is unnecessary to describe it further here. 56 indicates a flapper valve, which is pivoted near the top of the runner below the discharge opening 50 and is normally held with its free end in contact with a shelf 57 on the inner surface of the runner shank by means of a spring 58 to form an upper closure. This valve extends across between the sides of the runner shank, as is best shown in Fig. 10. The valve is provided at one end with a lug or projection 59 which, as is best shown in Fig. 10, projects laterally to one side of the side of the runner shank and above its top towards the gear 26. 60—60 indicate projecting wings, which are preferably secured to the hub of the gear 26 but may be secured, of course, to the shaft 25 so as to rotate with it. As the shaft 25 rotates in operating the seed-plate, first one and then the other of these wings—which are two in number and placed diametrically opposite each other—comes in contact with the lug 59 and forcing it upward lowers the valve 56 against the action of the spring 58, as is shown in Fig. 9. The wings are so placed and timed as to operate the valve as soon as the predetermined number of grains have been deposited through the discharge opening by the rotation of the seed-plate, as above described, and this movement in dropping the valve is so related to the movement of the lower closure valve 54 that it will not open to discharge the corn until the lower valve has been opened and nearly closed again.

The cycle of operation is shown in Figs. 7, 8 and 9, successively. In Fig. 7 the corn is shown as just accumulating on the upper valve with the previous charge held in the heel of the runner by the lower closure valve 54. Fig. 8 shows the upper valve still closed with the charge of corn accumulated upon it and the lower valve open and discharging the corn. Fig. 9 shows the upper valve opened and discharging the corn to the lower valve which has just closed. It will be understood, of course, that the operation of the throwing of both valves is rapid, the lower valve being thrown down quickly by the backward movement of the fork lever and returned instantly by the spring action,—the upper valve being opened, as has been described, by the action of one of the wings 60 which when it has lifted the lug 59 to open the valve slips past it, as shown in Fig. 9, the valve being practically instantaneously returned by the action of the spring 58. It will be obvious that as the rotation of the shaft 25 is controlled by means of the clutch mechanism, as above described, so that it is speeded if running too slowly and slowed down if running too fast at any given time, the operation of the valve 54 will be correspondingly regulated and timed, and the "dribbling" of the corn or the discharging of the corn so that it will pass through the lower opening before the lower valve is closed will be prevented.

I have shown in the drawings and described in the specification only one side of the planter, and the first figure of the drawing has illustrated only certain parts of the planter. It will, of course, be understood that the covering wheels, seed-boxes and check-rower mechanism are duplicated upon the other side of the planter, and it is believed that it is unnecessary to illustrate the planter further than has been shown, as in other respects than those above the planter may be of any well-known and ordinary construction.

That which I claim as my invention, and desire to secure by Letters Patent, is,—

1. In a corn-planter, the combination with seed-plates, carrying wheels and check-rower mechanism, of means for driving the seed-plates from the carrying wheels at a normal speed approximately corresponding with the seed-dropping motions of the check-rower mechanism, means operated by the check-rower mechanism to accelerate the motion of the seed-plates when the plates run too slow, and means operated by the check-rower mechanism to temporarily arrest the motion of the seed-plates when the speed of rotation thereof is too great, substantially as described.

2. In a corn-planter, the combination with seed-plates, carrying wheels, check-rower mechanism and gearing between said seed-plates and the carrying wheels adapted to drive the seed-plates normally at a speed approximately in time with the check-rower mechanism, of means operated by the check-rower mechanism to accelerate the seed-plates when they run at too slow a speed, and means operated by the check-rower mechanism to temporarily delay the seed-plates when they run too fast, substantially as described.

3. In a corn-planter, the combination with seed-plates, carrying wheels, check-rower mechanism and gearing between the seed-plates and the carrying wheels, of clutch mechanism interposed in said gearing between the carrying wheels and the seed-plates and adapted when normally in engagement to continuously drive the seed-plates at a speed approximately in time with the check-rower mechanism, means operated by the check-rower mechanism and upon said clutch mechanism to speed the seed-plates whenever they run too slow, and means operated by said check-rower mechanism adapted to temporarily disengage said clutch mechanism and arrest the motion of the seed-plates when running too fast, substantially as described.

4. In a corn-planter, the combination with seed-plates, carrying wheels, gearing between said seed-plates and carrying wheels and clutch mechanism interposed in said gearing between said seed-plates and carrying wheels and adapted when in engagement to continuously drive the seed-plates in proper seed-dropping time, of check-rower mechanism, an accelerator operated by said check-rower mechanism in inoperative relation to said clutch mechanism as long as the seed-plates are running in time with the seed-dropping mechanism and adapted to operate on said clutch mechanism to accelerate the speed of said seed-plates when moving too slow, and mechanism operated by said check-rower mechanism in inoperative relation to said clutch mechanism as long as said seed-plates are running at proper speed and adapted whenever said seed-plates run at too great a speed to temporarily disengage said clutch mechanism and arrest the motion of the seed-plates, substantially as described.

5. In a corn-planter, the combination with a seed-plate, means for driving the same, a runner having a seed-tube, a lower closure for said seed-tube, and check-rower mechanism for operating the same, of an upper closure valve in said seed-tube, and means connected with said seed-plate-driving mechanism for operating the same, substantially as described.

6. In a corn-planter, the combination with seed-plates, carrying wheels and check-rower mechanism, of means for driving the seed-plates from the carrying wheels at a normal speed approximately corresponding with the seed-dropping motions of the check-rower mechanism, means operated by the check-rower mechanism to accelerate the motion of the seed-plates when the plates run too slow, means operated by the check-rower mechanism to temporarily arrest the motion of the seed-plates when the speed of rotation thereof is too great, a runner having a discharge tube, a lower closure valve operated by said check-rower mechanism, and an upper closure valve adapted to be intermittently operated by the seed-plate-driving mechanism.

7. In a corn-planter, the combination with a seed-plate, carrying wheels, and check-rower mechanism, of a shaft, gearing between said shaft and said seed-plate, clutch mechanism on said shaft, means for driving said clutch mechanism when the members thereof are in engagement at a speed corresponding to the seed-dropping motions of the check-rower mechanism, means operated by said check-rower mechanism upon said clutch mechanism to speed the seed-plate when running too slowly and temporarily arrest its motion when running too fast, an upper closure valve, and means for intermittently operating said valve from said shaft.

WM. S. GRAHAM.

Witnesses:
W. F. MOORE,
H. M. MERCER.